US006497923B2

(12) United States Patent
Baalmann et al.

(10) Patent No.: US 6,497,923 B2
(45) Date of Patent: Dec. 24, 2002

(54) METHOD FOR PRODUCING AN ELECTRICAL INSULATOR

(75) Inventors: Alfred Baalmann, Osterholz-Scharmbeck (DE); Otto-Diedrich Hennemann, Osterholz-Scharmbeck (DE); Johannes Liebermann, Lichtenfels-Schönsreuth (DE); Klaus Vissing, Morsum (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/778,532

(22) Filed: Feb. 7, 2001

(65) Prior Publication Data

US 2001/0015284 A1 Aug. 23, 2001

Related U.S. Application Data

(63) Continuation of application No. PCT/DE99/02302, filed on Jul. 27, 1999.

(30) Foreign Application Priority Data

Aug. 7, 1998 (DE) ........................................ 198 35 883

(51) Int. Cl.[7] .............................. H05H 1/00; C08J 7/18

(52) U.S. Cl. ........................ 427/488; 427/489; 427/569

(58) Field of Search ................................ 427/488, 487, 427/489, 490, 569

(56) References Cited

U.S. PATENT DOCUMENTS 4,132,829 A * 1/1979 Hudis ......................... 427/488
4,938,995 A * 7/1990 Giordano et al. ........... 427/490
5,194,328 A * 3/1993 Suzuki et al. ............... 427/485
5,508,368 A * 4/1996 Knapp et al. ............... 427/562
6,242,054 B1 * 6/2001 Baalmann et al. .......... 427/490

FOREIGN PATENT DOCUMENTS

FR 2 317 748 2/1977

OTHER PUBLICATIONS

"Veränderung der Glasur von Isolatoren durch Behandlung mit Plamsa" (Tyman et al.), dated Oct. 17, 1996; pp. 1–5.

"High Voltage Ceramics for all Applications—by the Pioneer of Power Engineering"; Siemens Brochure 1997 pp. 1–24.

"The Dielectric Behavior of Plasma–Treated Insulator Surfaces", (Tu et al.), Conference Record of the 1990. IEEE International Symposium Jun. 1990 pp. 96–99.

"Behaviour of modified insulator surface material under electric stress"; Mordic Insulation Symposium, Jun. 1996 pp. 115–121.

* cited by examiner

*Primary Examiner*—Bret Chen
(74) *Attorney, Agent, or Firm*—Laurence A. Greenberg; Werner H. Stemer; Ralph E. Locher

(57) ABSTRACT

An electrical insulator is produced by coating a molded part of the insulator with a hydrophobic plasma-polymer coating. The plasma-polymer coating is produced by igniting a plasma in a non-polar working gas or a working gas having non-polar groups at a working pressure of between 0.001 Pa ($1 \cdot 10^{-5}$ mbar) and 50 Pa ($5 \cdot 10^{-1}$ mbar). The electrical power input per chamber volume lies between 0.5 and 5 kW/$m^3$, the gas flow per chamber volume lies between 10 and 1000 sccm/$m^3$. A durable, hard and hydrophobic plasma-polymer coating is created, the quality of which is independent of the material of the molded part.

22 Claims, 2 Drawing Sheets

METHOD FOR PRODUCING AN ELECTRICAL INSULATOR

CROSS-REFERENCE TO RELATED APPLICATION

This application is a continuation of copending International Application No. PCT/DE99/02302, filed Jul. 27, 1999, which designated the United States.

BACKGROUND OF THE INVENTION

1. Field of the Invention

The invention relates to a method of producing an electrical insulator. A hydrophobic plasma-polymer coating is applied to a molded part of the insulator.

The term "electrical insulator" is to be understood in this context to mean any electrically insulating component in an electric circuit or an electrical installation. Such an insulating component is, for example, a barrier layer used in a circuit, an insulating sheathing of a current-carrying conductor or a printed-circuit board for electronics. For the purposes of the present description, however, an electrical insulator is in particular also an insulator as used in power engineering for routing current-carrying lines or keeping them apart. In particular, an electrical insulator is also understood as meaning a high-voltage insulator, as used for routing overhead power lines or for keeping them apart. An insulating housing of a high-power semiconductor or of an electrical switching element, such as a thyristor or a thyratron for example, also represents an electrical insulator for the purposes of the present description.

Electrical insulators are produced from many different materials. However, plastic, glass and ceramic, in particular porcelain, are primarily used. The production of an electrical insulator from these materials generally takes place by molding a deformable raw composition and subsequently curing it. Depending on the material used, the curing in this case takes place by cooling, exposure to light or, in the case of ceramic, by firing. The molded insulator, which may also comprise a plurality of pieces of different material (known as a composite insulator), is referred to below as a molding. The production of such moldings of electrical insulators is general state of the art. For the production of a ceramic high-voltage insulator, reference may be had, by way of example, to the Siemens company publication "High-Voltage Ceramics for all Applications—by the Pioneer of Power Engineering!", Order No. A 96001-U10-A444-X-7600, 1997.

If an electrical insulator is used over a prolonged period, it is subject to a greater or lesser degree of superficial soiling, depending on the location at which it is used, which can considerably impair the original insulating characteristics of the clean insulator. For example, superficial flashovers occur due to the soiling. Because a rough surface soils more quickly than a smooth one, a ceramic insulator is, for example, provided with a surface glaze, which improves the technical properties of the insulator. The application of dirt-repellent lacquers or coatings to reduce the long-term soiling of the surface is also customary for other electrical insulators.

The same problem of loss of the insulating property exists if the electrical insulator is used in damp surroundings or where there is high atmospheric humidity or it is exposed outdoors to damp effects of the weather such as fog or rain. Condensation or rain causes water to precipitate on the surface of the electrical insulator. When it evaporates, previously dissolved dirt particles adhere to the surface of the insulator. Therefore, superficial soiling is formed over time, causing the insulating characteristics of the clean insulator to deteriorate. Even a smooth surface does not prevent this soiling. The same problem occurs if the insulator is used in a salty environment, such as for example near the coast or close to industrial sites.

To prevent premature flashover along the moist or soiled surface of the insulator, high-voltage insulators must be provided with so-called shielding ribs, whereby the creepage distance over the surface between the parts that are insulated from one another is extended to a considerable extent. However, this complex measure requires high expenditure on material and leads to high production costs.

As a solution to the problem of superficial soiling, in particular also in damp surroundings, the Siemens company publication "SIMOTEC Verbundinsulatoren: Ihr Schlüssel zu einer neuen Generation von Schaltanlagen" [SIMOTEC composite insulators: your key to a new generation of switchgear] Order No. A96001-U10-A413, 1996, discloses a so-called composite insulator which has shielding ribs made of a silicone rubber. The hydrophobic surface of the silicone rubber counters the formation of a film of water and the adherence of layers of foreign material. Water precipitated on the surface of such an insulator forms beads together with the foreign matter dissolved in the water, without a film of dirt being formed in the process.

However, in spite of its hydrophobic surface property, in damp surroundings silicone rubber tends gradually to take in water. This leads to a temporary deterioration in the insulating characteristics when there is high ambient atmospheric humidity and, if high voltages are to be insulated, leads to the insulator being destroyed if flashovers occur. This is because the taking in of water means that the flashover no longer occurs along the surface but partially through the insulator itself. The same adverse effects also occur if dust and dirt particles are incorporated into the surface of the silicone rubber.

Another proposal for producing a hydrophobic coating on an electrical insulator is disclosed by the publication "Insulators Glaze Modified by Plasma Processes", Tyman, Pospieszna, and Iuchniewicz; 9$^{th}$ International Symposium of High-voltage Engineering, Graz, Austria, Aug. 28 to Sep. 1, 1995. There, a hydrophobic, plasma-polymer coating is produced on the glaze of a ceramic by plasma-treatment processes. For this purpose, in a first working step, a noble-gas plasma is produced from argon in a closed vessel, in order to detach alkali ions, such as sodium or potassium, that are located in the glaze, from the surface by gas bombardment. After this surface treatment, hexamethyldisiloxane (HMDSO) is admitted into the vessel as the working gas and a plasma is in turn produced from this gas at a pressure of over 1.12 mbar (112 Pa). The removed alkali ions are replaced by chemically solidly bonded hydrophobic groups by a plasma-polymerization process. In this process, a plasma-polymer, hydrophobic coating is formed. The hydrophobia and adherence of the plasma-polymer coating is disadvantageously dependent on the type of glaze. For instance, it is found that a brown glaze, which has far fewer sodium ions than a white glaze, offers better preconditions for a plasma-polymerization process and displays favorable chemical compounds for the formation of the hydrophobic layer.

The prior art process accordingly produces a hydrophobic coating on the glaze of a ceramic insulator by plasma polymerization. The quality of the coating, however, is strongly dependent on the composition of the glaze. The process was carried out on very small pieces of ceramic in a Leyden jar. It is not suitable for the coating of large electrical insulators.

SUMMARY OF THE INVENTION

The object of the present invention is to provide a method of producing an electrical insulator which overcomes the above-noted deficiencies and disadvantages of the prior art devices and methods of this general kind, and wherein a hydrophobic plasma-polymer coating is applied to a molded part of the insulator. The hydrophobic plasma-polymer coating is intended in this case to be applied with the same quality, independently of the material of the molded part or of the material of its surface. Furthermore, the production method is to be equally suitable for insulators of any desired size, i.e. for insulators of microelectronics up to high-voltage insulators of several meters in length. The applied plasma-polymer coating is to be durable and hard and also solidly bonded to the material of the molded part.

With the above and other objects in view there is provided, in accordance with the invention, a method of producing an electrical insulator, which comprises the following steps:

introducing a molded part of an insulator into a vacuum chamber of a plasma reactor and evacuating the chamber;

admitting a non-polar working gas or a working gas having non-polar groups into the chamber;

adjusting a working pressure of between 0.001 Pa and 50 Pa in the chamber under continuous gas flow;

forming a plasma from the working gas by generating an electrical field in the chamber, wherein an electrical power input per chamber volume is set to between 0.5 $kW/m^3$ and 5 $kW/m^3$ and a gas flow per chamber volume is set to between 10 $sccm/m^3$ and 1000 $sccm/m^3$;

maintaining the plasma at least until a closed hydrophobic coating of the plasma polymer formed from the plasma of the working gas is formed on a surface of the molded part; and switching off the field and removing the coated insulator from the chamber.

In other words, the molded part of the insulator that is produced in a known manner is introduced into an evacuable chamber of a plasma reactor, the chamber is evacuated, a non-polar working gas or a working gas having non-polar groups is admitted to the chamber. A working pressure of between 0.001 Pa ($1\cdot10^{-5}$ mbar) and 50 Pa ($5\cdot10_{-1}$ mbar) is set in the chamber under a continuous gas flow, and a plasma is formed from the working gas by generating an electric field. The electrical power input per chamber volume is set between 0.5 kilowatt/$m^3$ and 5 kilowatts/$m^3$ and the gas flow per chamber volume is set between 10 $sccm/m^3$ and 1000 $sccm/m^3$. The plasma is maintained at least until a closed coating of the plasma polymer formed from the plasma of the working gas is formed on the surface of the molded part, the field is switched off and the finished coated insulator is removed from the chamber.

The unit "sccm" is the unit which is customary in plasma technology. It stands for standard cubic centimeters and refers to the gas volume converted to standard conditions. The standard conditions are defined by a temperature of 25° C. and by a pressure of 10.13 Pa (1013 mbar).

The invention is based in this respect on the fact that, according to the prior art, in a method for producing a hydrophobic plasma-polymer coating on the glaze of a ceramic insulator, a working pressure of over 1.12 mbar is used. At this relatively high working pressure, the average free path length between the ionized molecules of the plasma is relatively small. Therefore, polymerization and precipitation of the substance formed already occurs in the plasma as a result of interaction of the ionized molecules. Inhomogeneities of the coating occur at the surface of the insulator itself on which the plasma polymer should actually form. According to the prior art, an ion bombardment forms on the surface of the substrate to be coated. This ion bombardment is inhomogeneous. In this way, shaded areas of the substrate to be coated are no longer reached by the ionized molecules of the plasma, so that no coating with the plasma polymer can take place there. At the working pressure of over 100 Pa (1 mbar), a uniform homogeneous coating of the substrate can be produced only for a substrate of even proportions and small dimensions. The spatial extent of the plasma may in this case only vary within a few centimeters. This is because investigations have shown that, with a spatial extent of the plasma over more than 50 cm, a homogeneous coating is no longer possible at the working pressure of over 100 Pa (1 mbar) for physical reasons.

In the case of the method according to the prior art for coating the glaze of a ceramic insulator, however, the working pressure cannot simply be reduced, since working of the pretreated glaze by the ions of the plasma can then no longer be achieved. Replacement of the alkali ions detached from the glaze by chemically solidly bonded groups of the plasma polymer formed can then no longer be accomplished.

It was thus surprisingly found that, if the working pressure is set to $1\cdot10^{-5}$ mbar and $5\cdot10^{-1}$ mbar, a durable plasma-polymer coating can be accomplished if the plasma is additionally formed with an electrical power input per chamber volume of between 0.5 kilowatt/$m^3$ and 5 kilowatts/$m^3$ and with a gas flow per chamber volume of between 10 and 1000 $sccm/m^3$.

It was additionally also surprisingly found that the plasma-polymer coating formed by following such a procedure is independent of the material of the chosen insulator. No pretreatment of the surface of the insulator is necessary either to create a reactive surface to which the plasma polymer then chemically bonds, for example by detaching alkali ions from the glaze by means of argon sputtering. At the chosen working pressure and with the chosen power input, the plasma polymer formed evidently crosslinks with itself so well that the chemical bonding to the surface of the insulator is not of any importance. An abrasion-resistant and hard coating is formed from the plasma polymer. The non-polar working gas or working gas having non-polar groups produces a not very reactive, i.e. low-energy, plasma-polymer surface as a coating on the surface of the insulator. This surface is hydrophobic, i.e. water-repellent, to a high degree. In addition, the plasma-polymer coating is resistant to UV exposure. Furthermore, such a coating or layer does not absorb water. The penetration of dust and dirt particles into the surface is also prevented.

At the specified working pressure, an oriented movement of plasma constituents does not occur. Ion bombardment does not occur. The relatively great free path length of the plasma constituents has the effect that polymerization does not already occur in the plasma, but only at the site of the sample to be coated. A homogeneous coating can be accomplished even for insulators of large dimensions.

The expression plasma polymer refers to a polymer produced by the plasma process which, as distinct from a polymer produced by conventional chemical means, has a much higher crosslinkage of the individual molecular groups among one another, is not oriented but amorphous and, moreover, has a much higher density. A plasma polymer is distinguished, for example in comparison with a conventional polymer, by broadening of the infrared vibration bands measured by means of IR spectroscopy.

The method according to the invention offers the advantage that an electrical insulator can be produced with a durable, abrasion-resistant and highly hydrophobic plasma-polymer coating. The size and material of the molded part of the insulator intended for coating are of no significance. In this respect, the method is suitable in particular for insulators with large dimensions, such as for example high-voltage insulators with lengths of several meters.

In an advantageous refinement of the invention, the electrical power input per chamber volume is between 1 kilowatt/$m^3$ and 3.5 kilowatts/$m^3$.

It is also advantageous if the gas flow per chamber volume is set between 20 sccm/$m^3$ and 300 sccm/$m^3$.

For the resistance of the plasma-polymer coating and for the protection of the molded part from external influences, it is advantageous if the plasma is maintained until the plasma-polymer coating has a layer thickness of between 100 nm and 10 $\mu$m.

For cleaning off oxidizable components, such as oils or greases, which adhere to the surface of the molded part of the insulator, it is advantageous to introduce into the chamber when it is being evacuated an oxygen-containing gas, in particular air, at such a metered rate that a pressure of between 1 and 5 mbar temporarily prevails in the chamber, with a plasma being simultaneously ignited in the gas for a period of between 1 second and 5 minutes. In this way, an oxidation of the surface impurities takes place. The oxidized constituents are desorbed. After this treatment, the clean surface of the molded part of the insulator is obtained.

In accordance with an added feature of the invention, the plasma is ignited in a clock-controlled manner. It has been found that the homogeneity of the plasma-polymer coating can be increased in this way.

In accordance with an additional feature of the invention, it is advantageous in clock-controlled ignition if the plasma is ignited at a clock rate of 0.1 to 100 Hz.

The ignition of the plasma by generating an electric field can take place in a way known per se. For instance, the electric field may be inductively or capacitively coupled in by means of a microwave generator. Investigations have shown, however, that plasma ignition by applying a voltage to electrodes arranged on the chamber is particularly suitable, in particular for the treatment of molded parts of large and elongate insulators. In this case, one electrode is designed for example in the form of a rod, while the other electrode is formed by the chamber wall itself. Two opposite rod-shaped electrodes may also be used. When the plasma is ignited by means of electrodes, parts of the surface of the molding to which access is difficult are also reliably coated with the plasma polymer.

In principle, the plasma can be produced by an electric field which is constant over time. However, it is advantageous if the electric field is an alternating electric field with a frequency of between 1 kHz and 5 GHz. The frequency actually used is in this case dependent on the working gas used.

In a further advantageous refinement of the invention, a working pressure of between 0.1 Pa ($1\cdot10^{-3}$ mbar) and 10 Pa ($1\cdot10^{-1}$ mbar is set in the chamber.

It is particularly favorable for the production of the plasma-polymer coating if a hydrocarbon, in particular acetylene and/or methane, is used as the working gas.

It is advantageous for the quality of the plasma-polymer coating produced on the molded part of the insulator if an organosilicon or organofluorine compound is used as the working gas. The plasma polymer formed from the plasma of these compounds is distinguished by a high degree of crosslinkage of the individual molecular groups among one another. On account of this crosslinkage, the coating produced is extremely stable and protected from external effects. It has a high level of hardness. Moreover, plasma polymers which have been produced from the plasma of non-polar organosilicon or organofluorine compounds or organosilicon or organofluorine compounds having non-polar groups display a high and sustained level of hydrophobia.

It is particularly favorable for the hydrophobia, hardness and quality of the plasma-polymer coating if hexamethyldisiloxane, tetraethylortho-silicate, vinyltrimethylsilane or octofluorocyclobutane is used as the working gas. Similarly, a mixture of the working gases mentioned produces a good result.

In accordance with a further advantageous refinement of the invention, an additional gas is admixed with the working gas. In this case it is advantageous if the additional gas is a noble gas, a halogen, in particular fluorine, oxygen, nitrogen or a mixture thereof.

The method for producing a plasma-coated insulator is suitable in particular for a high-voltage insulator. A high-voltage insulator may have dimensions from just a few centimeters up to several meters. In particular, the method is suitable for a long-rod insulator, as is used for supporting overhead lines. Such an insulator is produced as a molding with a number of disk-shaped shielding ribs, in order in this way to increase the conducting path distance between the two ends of the insulator. Such an insulator offers reliable protection from flashovers, even when its surface is soiled.

Since an insulator provided with a plasma-polymer coating as provided by the production method according to the invention has a highly hydrophobic surface, it is reliably protected from dirt being deposited due to impurities dissolved in water. Since the insulator is protected in this way from soiling, specifically when it is operated for a prolonged period outdoors, it is possible to dispense with increasing the conduction distance by forming shielding ribs. It is even conceivable in this respect to design the insulator in the ideal form as an elongate tube. In this way, an enormous saving of material is brought about in comparison with a conventional high-voltage insulator. The production method also turns out to be particularly simple for producing the molding and is, moreover, much more favorable than the production method for a molding provided with shielding ribs.

Since the quality of the plasma-polymer coating produced is independent of the material of the molding of the electrical insulator, it is particularly expedient if the molding consists of a fired ceramic, a glazed, fired ceramic, a glass or a plastic, such as for example a silicone rubber, an epoxy resin or a glass-fiber-reinforced plastic. Specifically in the case of a rough surface as well, such as a fired, but unglazed ceramic, the production method according to the invention produces an insulator with a highly hydrophobic surface which even exceeds the properties of a ceramic insulator that is glazed but not provided with a hydrophobic coating. The rough surface does not present any difficulties for the application of the coating. A molding of a silicone rubber can also be processed by the method according to the invention into an insulator with a hydrophobic plasma-polymer coating. In this way, the good electrical and dirt-repellent properties of an insulator made of a silicone rubber are retained unchanged, with the undesired properties of the silicone rubber, that is the taking in of water and/or the incorporation of dust and dirt particles, also being reliably avoided. Moreover, any desired plastic can be further processed by the method according to the invention into a high-quality insulator provided with a hydrophobic surface. The invention opens up the possibility of producing a molding for an insulator from any desired plastic and providing this molding with a hydrophobic coating by plasma polymerization. Such a plastic insulator has much improved long-term characteristics with regard to its insulating capability in comparison with a conventional plastic insulator. In the long term, such plastic insulators could replace the expensive silicone rubber insulators. Here, too, the invention also opens up the possibility of avoiding complex forms for an insulator to increase leakage distances.

Other features which are considered as characteristic for the invention are set forth in the appended claims.

To explain the invention, two examples are presented below:

EXAMPLE 1

A known procedure is used for preparing a kneadable composition from the starting materials kaolin, feldspar, clay and quartz by mixing with water, and for producing a hollow-cylindrical clay body with a number of shielding ribs from this composition by turning. The clay body is dried and fired to form a molded part. The length of the molded part is approximately 50 cm. The molded part of the ceramic insulator is introduced into an evacuable chamber with a volume of 1 $m^3$ of a plasma reactor. After the chamber has been evacuated, a mixture of hexamethyldisiloxane and helium is introduced as the working gas.

Under a continuous gas flow of 30 sccm of hexamethyldisiloxane and 30 sccm of helium, a working pressure of $9 \cdot 10^{-3}$ mbar is set in the chamber by controlled pumping extraction. Under these conditions, a plasma is ignited in the working gas by means of electrodes. For this purpose, an alternating electric field is applied to the electrodes with a frequency of 13.56 MHz and a power of 2 kW. After a period of 30 minutes, the molded part now provided with a hydrophobic plasma-polymer coating, i.e. the finished high-voltage insulator, is removed from the chamber after air has been admitted.

EXAMPLE 2

A molded part, produced according to example 1, of the ceramic high-voltage insulator is introduced into an evacuable chamber with a volume of 350 1 of a plasma reactor. Vinyltrimethylsilane is used as the working gas. With a flow of 100 sccm, a working pressure of $1.5 \cdot 10^{-1}$ mbar is set in the chamber. A plasma is ignited in the chamber by applying an electric voltage to electrodes. The voltage is an AC voltage with a frequency of 13.56 MHz. The power consumed is 1.2 kW. After a period of 20 minutes, the molded part provided with a hydrophobic plasma-polymer coating is removed from the chamber after air has been admitted.

Although the invention is illustrated and described herein as embodied in a method for producing an electrical insulator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
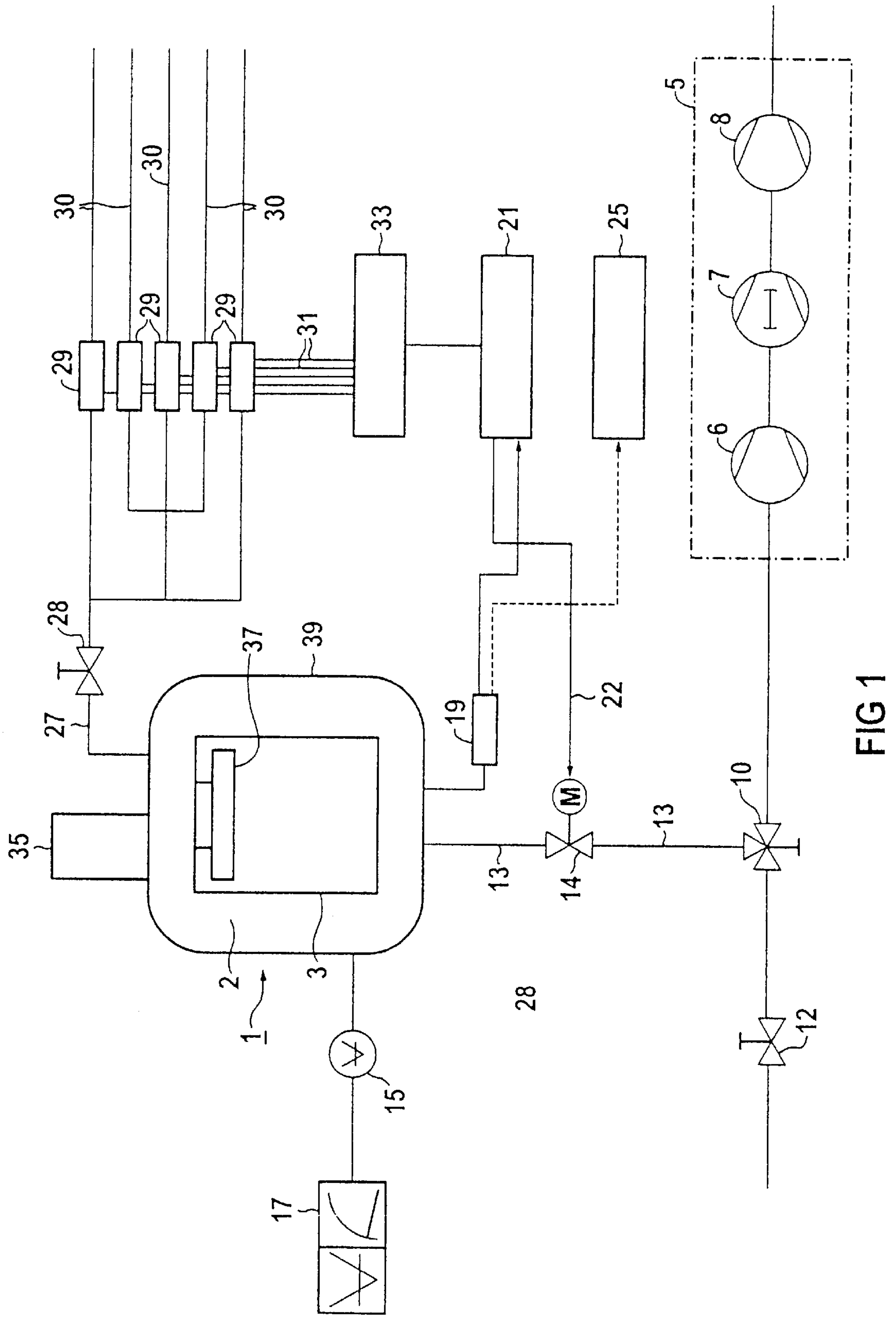
FIG. 1 is a block diagram of an installation for applying a hydrophobic plasma-polymer coating to a molded part of an insulator.

Referring now to the figures of the drawing in detail and first, particularly, to FIG. 1 thereof, there is seen an installation for applying a hydrophobic plasma-polymer coating to a molded part of an electrical insulator. The installation comprises a plasma reactor 1, which is designed as an evacuable metal chamber 2—a vacuum chamber 2—with a viewing glass 3 arranged in it. Provided for evacuating the chamber 2 is a pumping unit 5, which has an oil diffusion pump 6, a Roots pump 7, and a rotary slide-valve pump 8 connected in series one behind the other. For evacuating the chamber 2, in this case firstly the rotary slide-valve pump 8, subsequently the Roots pump 7, and finally the oil diffusion pump 6 are switched on.

Either the pumping unit 5 or a ventilation valve 12 of the suction line 13 in connection with the chamber 2 can be switched on by means of a three-way valve 10. For controlling the pumping rate, a controllable throttle valve 14 is additionally fitted in the suction line 13.

The pressure is monitored with a Pirani pressure gauge 15, which communicates with the interior space of the chamber 2, and with a pressure indicator 17, which is connected to the pressure gauge 15. The Pirani gauge 15 operates reliably down to a pressure range of $10^{-3}$ mbar (0.1 Pa). For automatically controlling the operating pressure prevailing in the chamber 2, a so-called baratron 19, which is connected to the interior space of the chamber 2, is provided. In a baratron 19, the pressure is measured via a change in the capacitance between a membrane and a fixed plate. The baratron 19 produces reasonable pressure values down to just a few $10^{-4}$ mbar. For automatically controlling the pressure, a pressure controller 21 is connected to the outlet of the baratron 19 and compares the measured actual value for the prevailing pressure with a predetermined set value and controls the throttle valve 14 via a control line 22. If, for example, the working pressure in the interior of the chamber 2, measured by means of the baratron 19, is lower than the predetermined set value, the throttle valve 14 is opened slightly less via the control line 22, so that the suction rate of the pumping unit 5 with respect to the chamber 2 is reduced. An electrical supply unit 25 supplies current and voltage to the baratron 19.

For admitting the working gas into the chamber 2 of the plasma reactor 1, a supply line 27 is connected to the chamber 2. A series of process-gas lines 30 can be opened via an actuating valve 28 and via a number of flow controllers 29. The process-gas lines 30 are connected in each case to a pressurized-gas cylinder for gas. The five process-gas lines 30 shown in FIG. 1 are connected, for example, to pressurized-gas cylinders for hexamethyldisiloxane, vinyltrimethylsilane, argon, oxygen or nitrogen.

The flow controllers 29 allow a specific gas mixture to be set and fed to the chamber 2 via the supply line 27.

Since the working gas is consumed when the plasma-polymer coating is produced, a continuous flow of the working gas is maintained through the chamber 2. In this way, gas for forming the plasma-polymer coating is constantly replenished. The corresponding flow of the components of the working gas is controlled by the flow controllers 29 by means of connecting lines 31 via a gas-flow controller 33. The gas-flow controller 33 itself is connected to a pressure controller 21. In this way, with a predetermined flow of components of the working gas, a desired working pressure is exactly achieved in the chamber 2 by the throttle valve 14 being activated.

The ignition of a plasma in the working gas in the interior space of the chamber 2 takes place by an electric voltage being applied to an HF electrode 35. This electrode is formed in the interior space of the chamber 2 as an elongate rod electrode 36. The metal housing of the chamber 2 itself acts to a certain extent as a second electrode. A voltage generator 37 is provided for generating the voltage.

A molded part of the electrical insulator is introduced into the chamber 2 of the plasma reactor 1. Subsequently, the chamber 2 is evacuated via the pumping unit 5 with the three-way valve 10 in a corresponding position.

Oxygen is admitted into the chamber with a defined inflow by the corresponding flow controller 29, and while controlling the suction rate of the pumping unit 5 applied to the chamber 2 by means of the throttle valve 14. The pressure prevailing in this case in the chamber is regulated to 3 mbar. At the same time, a plasma is ignited in the chamber 2 for a period of between 1 second and 5 minutes by means of the voltage generator 37, by an electric voltage being applied to the HF electrode 35. In this way, superficial impurities, in particular greases and oils, are cleaned off the surface.

Subsequently, the oxygen feed is throttled by means of the corresponding flow controller 29. The chamber is once again evacuated and hexamethyldisiloxane and helium is admitted under a controlled inflow of 300 sccm of. The suction rate of the pumping unit 5 is controlled by the throttle valve 14 in such a way that the working pressure prevailing in the chamber 2 is $9 \cdot 10^{-2}$ mbar. A plasma is ignited from the working gas in the chamber 2 via the voltage generator 37 by means of the HF electrode 35. An AC voltage with a frequency of 13.56 MHz is used as the voltage. For producing the hydrophobic plasma-polymer coating, the power consumption is 3.5 kW.

The plasma remains ignited for a period of 5 minutes to 60 minutes. Subsequently, the chamber 2 is vented via the ventilation valve 12 with the three-way valve 10 in a corresponding position and the throttle valve 14 slowly opened. The finished insulator, provided with a hydrophobic plasma-polymer coating, is removed from the chamber 2.

Figure 2:
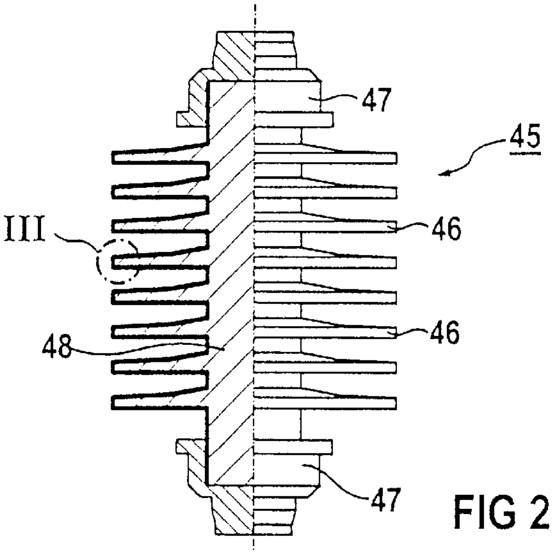
FIG. 2 is a diagram of a ceramic high-voltage insulator with a hydrophobic plasma-polymer coating and an enlarged representation of the same.

A ceramic high-voltage insulator 45 is represented in FIG. 2 in a partially broken-open view, with a number of shielding ribs 46. The high-voltage insulator consists entirely of a ceramic 48. For connecting to the current-carrying parts to be insulated, the high-voltage insulator 45 also has connection pieces 47 on both sides.

The ceramic high-voltage insulator 45 was provided in an installation constructed in accordance with FIG. 1 with a hydrophobic plasma-polymer coating by igniting a plasma in the working gas hexamethyldisiloxane.

Figure 3:
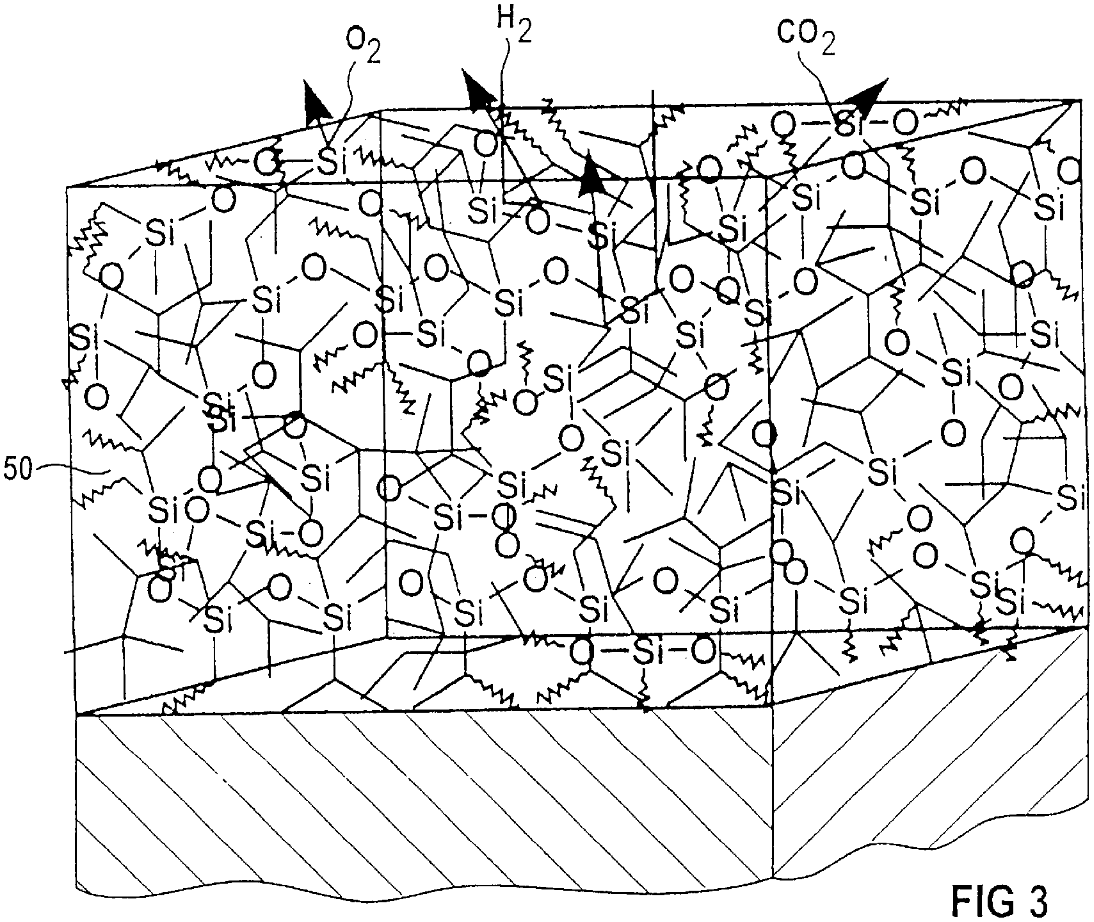
FIG. 3 is a schematic diagram of the plasma-polymer coating of the high-voltage insulator according to FIG. 2 in an enlarged detail.

The structure of this hydrophobic plasma-polymer coating can be easily seen in the enlarged portion III of FIG. 2, represented in FIG. 3. The thickness of the applied coating is approximately 1000 nm. It can be seen very easily that a high degree of crosslinkage has formed between the molecular groups of the plasma-polymer coating. Oriented structures such as those in a conventional polymer cannot be seen.

Rather, it is an amorphous structure. The high degree of crosslinkage has the effect that such a plasma-polymer coating has a high structure density and consequently prevents molecules such as oxygen, hydrogen or carbon dioxide from diffusing through. Moreover, the plasma-polymer coating has a high level of hardness, which can be explained by the oxygen bonds of individual silicon atoms. As a result of the non-polar $CH_3$ groups of the hexamethyldisiloxane, the plasma-polymer coating formed from this working gas also has a low level of energy and is consequently highly hydrophobic.

The hydrophobic property and the long-term resistance of the plasma-polymer coating produced as provided by the production method according to the invention is demonstrated below on the basis of tests:

Test 1

A ceramic high-voltage insulator provided with a glaze is compared with a ceramic high-voltage insulator of an identical form which is provided with a hydrophobic plasma-polymer coating. The plasma-polymer coating was in this case produced by plasma ignition in a working gas of hexamethyldisiloxane and helium. The chosen parameters were identical to those named in Example 1. The period for the formation of the plasma-polymer coating was 30 minutes. The layer thickness of the applied plasma-polymer coating was 1000 nm. The plasma-polymer coating was applied directly to the glaze.

The length of both high-voltage insulators was 50 cm. The high-voltage insulators have nine shielding ribs, which are spaced apart from one another by a shielding spacing of 45 mm. The shielding diameter is 223 mm; the shank diameter is 75 mm. The number of shields gives both insulators a leakage path length of 1612 mm.

The insulating characteristics of the two insulators are tested as provided by the salt spray method according to IEC 507 (1991). The plasma-polymer coating was applied directly to the glaze. As preparation for this, both high-voltage insulators were washed with trisodium phosphate. Subsequently, conditioning tests and one-hour salt-spray tests were conducted with a test voltage of 23 kV (AC voltage) on both high-voltage insulators at the highest salt-mass concentration of 224 kg/m$^3$ of air or spray. The test voltage is in this case obtained as a proportionate voltage for a high-voltage insulator in the case of a four-link chain in a system of $U_{max}$=161 kV. Throughout the entire test, the test voltage and the discharge current are continuously registered.

The flashover voltages determined on the high-voltage insulator with plasma-polymer coating in the preconditioning test correspond to the measured flashover voltages of the glazed ceramic high-voltage insulator. This means that the increase in the hydrophobia brought about by the plasma-polymer coating has no influence on the flashover voltages.

TABLE 1

| Test voltage ($kV_{eff}$) | Specific creepage path length (mm/kV) | Highest discharge current in withstand tests, $I_{highest}$ (mA) |
|---|---|---|
| 23 | 40.5 | 1590 (shield bridgings) |
| 23 | 40.5 | 1400 (shield bridgings) |

TABLE 1-continued

| Test voltage ($kV_{eff}$) | Specific creepage path length (mm/kV) | Highest discharge current in withstand tests, $I_{highest}$ (mA) |
|---|---|---|
| 23 | 40.5 | 1260 (shield bridgings) |

TABLE 2

| Test voltage ($kV_{eff}$) | Specific creepage path length (mm/kV) | Highest discharge current in withstand tests, $I_{highest}$ (mA) |
|---|---|---|
| 23 | 40.5 | 600 |
| 23 | 40.5 | 1100 (shield bridgings) |
| 23 | 40.5 | 550 |

After the preconditioning tests, three one-hour salt-spray tests are conducted at the test voltage of 23 kV. The highest discharge current in each case is measured. The results for the untreated glazed ceramic high-voltage insulator are presented in table 1 and the results for the glazed high-voltage insulator provided with a plasma-polymer coating are presented in table 2. In comparison with the untreated high-voltage insulator (see table 1), shield bridgings occur less frequently in the one-hour salt-spray tests for the high-voltage insulator provided with a plasma-polymer coating (see table 2). The highest discharge currents are much smaller for 1.0 the high-voltage insulator provided with a plasma-polymer coating than in the case of the untreated glazed high-voltage insulator.

Test 2

A ceramic high-voltage insulator designed according to Test 1 and provided with a plasma-polymer coating is subjected to a 1000-hour salt-spray test according to IEC-1109. Even after operating in a salt spray for 1000 hours, the high-voltage insulator still had the same properties as at the beginning of the test. This demonstrates the durability and high level of hydrophobia of the plasma-polymer coating. Such a result cannot be achieved with untreated, glazed ceramic high-voltage insulators.

Test 3

The wetting angle on three different ceramic high-voltage insulators, all provided with a hydrophobic plasma-polymer coating according to example 1, is investigated. The treated molded parts were all ceramic molded parts. In the case of molded part A, the insulator material was additionally provided with a brown glaze, in the case of molded part B with a white glaze. The molded part of insulator C was unglazed. The wetting angles are determined in accordance with the standard DIN-EN 828 for distilled water and for NaCl-containing water with an NaCl fraction of 25% by weight. The result is compiled in Table 3. It should be noted in this case that a greater wetting angle is established on the surface of the unglazed insulator than on the surfaces of the glazed insulators with the same hydrophobia on account of the greater roughness.

TABLE 3

| Insulator material | A | B | C |
|---|---|---|---|
| $H_2O$ | 108.0 | 109.2 | 131.0 |
| $H_2O_{NaCl}$ | 107.0 | 108.0 | 136.3 |
| | strongly hydrophobic | strongly hydrophobic | very strongly hydrophobic |

We claim:

1. A method of producing an electrical insulator, which comprises the following steps:
   - introducing a molded part of an insulator into a vacuum chamber of a plasma reactor and evacuating the chamber;
   - admitting a non-polar working gas or a working gas having non-polar groups into the chamber; adjusting a working pressure of between 0.001 Pa and 50 Pa in the chamber under continuous gas flow;
   - forming a plasma from the working gas by generating an electrical field in the chamber, wherein an electrical power input per chamber volume is set to between 0.5 $kW/m^3$ and 5 $kW/m^3$ and a gas flow per chamber volume is set to between 10 $sccm/m^3$ and 1000 $sccm/m^3$;
   - maintaining the plasma at least until a closed hydrophobic coating of the plasma polymer formed from the plasma of the working gas is formed on a surface of the molded part; and
   - switching off the field and removing the coated insulator from the chamber.

2. The production method according to claim 1, which comprises setting the electrical power input per chamber volume to between 1 $kilowatt/m^3$ and 3.5 $kilowatts/m^3$.

3. The production method according to claim 1, which comprises setting the gas flow per chamber volume to between $sccm/m^3$ and 300 $sccm/m^3$.

4. The production method according to claim 1, which comprises maintaining the plasma until the plasma-polymer coating has a layer thickness of between 100 nm and 10 $\mu$m.

5. The production method according to claim 1, which comprises introducing an oxygen-containing gas into the chamber during the evacuating step at such a rate that a pressure of between 100 and 500 Pa temporarily prevails in the chamber, and simultaneously igniting a cleaning plasma in the gas of the chamber for a period of between 1 second and 5 minutes.

6. The production method according to claim 5, wherein the oxygen-containing gas is air.

7. The production method according to claim 1, which comprises igniting the plasma at regular time intervals.

8. The production method according to claim 1, which comprises igniting the plasma at regular time intervals at a rate of 0.1 to 100 Hz.

9. The production method according to claim 1, which comprises igniting the plasma by applying a voltage to electrodes disposed in the chamber.

10. The production method according to claim 1, wherein the electrical field generated in the chamber is an alternating electric field with a frequency of between 1 kHz and 5 GHz.

11. The production method according to claim 1, which comprises maintaining a working pressure of between 0.1 Pa and 10 Pa in the chamber.

12. The production method according to claim 1, which comprises using a hydrocarbon as the working gas.

13. The production method according to claim 12, which comprises selecting the hydrocarbon from the group consisting of acetylene and methane.

14. The production method according to claim 1, which comprises selecting the working gas from the group consisting of an organosilicon and an organofluorine compound.

15. The production method according to claim 14, which comprises selecting the working gas from the group consisting of hexamethyldisiloxane, tetraethylorthosilicate, vinyltrimethylsilane, and octofluoro-cyclobutane, and a mixture thereof.

16. The production method according to claim 1, which comprises admixing an additional gas with the working gas.

17. The production method according to claim 16, which comprises admixing a gas selected from the group consisting of a noble gas, a halogen, oxygen, and nitrogen, and a mixture thereof, as the additional gas.

18. The production method according to claim 17, wherein the halogen is fluorine.

19. The production method according to claim 1, wherein the insulator is a high-voltage insulator.

20. The production method according to claim 1, wherein the insulator is a long-rod insulator.

21. The production method according to claim 1, which comprises selecting the molded part from the group of moldings consisting of fired ceramic, glazed, fired ceramic, glass, and plastic.

22. The production method according to claim 21, which comprises selecting the plastic from the group consisting of silicone rubber, epoxy resin, and glass-fiber-reinforced plastic.

* * * * *